(12) United States Patent
Hwang et al.

(10) Patent No.: US 11,994,652 B2
(45) Date of Patent: May 28, 2024

(54) POLARIZING PLATE AND OPTICAL DISPLAY INCLUDING THE SAME

(71) Applicant: Samsung SDI Co., Ltd., Yongin-si (KR)

(72) Inventors: Ji Hyun Hwang, Suwon-si (KR); Yoo Jin Kim, Suwon-si (KR); Jin Woo Kim, Suwon-si (KR); Dong Yoon Shin, Suwon-si (KR); Bae Wook Lee, Suwon-si (KR); Sung Man Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1265 days.

(21) Appl. No.: 16/205,144

(22) Filed: Nov. 29, 2018

(65) Prior Publication Data
US 2019/0204479 A1 Jul. 4, 2019

(30) Foreign Application Priority Data
Dec. 28, 2017 (KR) .......................... 10-2017-0183239

(51) Int. Cl.
*G02B 1/14* (2015.01)
*B32B 7/12* (2006.01)
(Continued)

(52) U.S. Cl.
CPC .................. *G02B 1/14* (2015.01); *B32B 7/12* (2013.01); *B32B 27/08* (2013.01); *B32B 27/306* (2013.01);
(Continued)

(58) Field of Classification Search
CPC .. G02B 5/003; G02B 5/22; G02B 1/14; G02F 1/133512; G02F 1/133528;
(Continued)

(56) References Cited

U.S. PATENT DOCUMENTS 5,700,295 A * 12/1997 Fuso ..................... D06P 1/6426
544/218
2004/0198126 A1 * 10/2004 Kunisada ................ B32B 27/32
442/394
(Continued)

FOREIGN PATENT DOCUMENTS

CN 1400494 A * 3/2003 ....... G02F 1/133512
KR 20080084352 A * 9/2008
(Continued)

OTHER PUBLICATIONS

Korean Office Action dated Nov. 18, 2019 from corresponding Korean Application No. 10-2017-0183239 (5 pgs.).

*Primary Examiner* — Sophie Hon
*Assistant Examiner* — Sow-Fun Hon
(74) *Attorney, Agent, or Firm* — Lewis Roca Rothgerber Christie LLP (57) ABSTRACT

A polarizing plate and an optical display including the same are provided. The polarizing plate is composed of a display region and a non-display region surrounding the display region, and includes: a polarizer; and a bonding layer and a first polarizer protective film sequentially stacked on an upper surface of the polarizer. A light shielding layer includes a UV absorbent material and is embedded in the bonding layer to constitute at least a portion of the non-display region. The light shielding layer is formed on at least one surface of the first polarizer protective film.

22 Claims, 4 Drawing Sheets

(51) Int. Cl.
| | |
|---|---|
| B32B 27/08 | (2006.01) |
| B32B 27/30 | (2006.01) |
| B32B 27/36 | (2006.01) |
| C08K 5/3492 | (2006.01) |
| C09D 5/32 | (2006.01) |
| C09D 7/48 | (2018.01) |
| C09D 7/61 | (2018.01) |
| C09J 7/22 | (2018.01) |
| C09J 9/00 | (2006.01) |
| C09J 133/08 | (2006.01) |
| G02B 5/00 | (2006.01) |
| G02F 1/00 | (2006.01) |
| C08K 3/04 | (2006.01) |
| C08K 3/08 | (2006.01) |
| C08K 3/11 | (2018.01) |
| C08K 5/00 | (2006.01) |
| C08K 5/07 | (2006.01) |
| C08K 5/09 | (2006.01) |
| C08K 5/132 | (2006.01) |
| C08K 5/134 | (2006.01) |
| C08K 5/20 | (2006.01) |
| C08K 5/23 | (2006.01) |
| C08K 5/315 | (2006.01) |
| C08K 5/3417 | (2006.01) |
| C08K 5/3435 | (2006.01) |
| C08K 5/3437 | (2006.01) |
| C08K 5/3475 | (2006.01) |
| G02B 5/30 | (2006.01) |

(52) U.S. Cl.
CPC ............ *B32B 27/36* (2013.01); *C08K 5/3492* (2013.01); *C09D 5/32* (2013.01); *C09D 7/48* (2018.01); *C09D 7/61* (2018.01); *C09J 7/22* (2018.01); *C09J 9/00* (2013.01); *C09J 133/08* (2013.01); *G02B 5/003* (2013.01); *G02F 1/00* (2013.01); *B32B 2255/10* (2013.01); *B32B 2307/42* (2013.01); *B32B 2457/20* (2013.01); *C08K 3/04* (2013.01); *C08K 3/08* (2013.01); *C08K 3/11* (2018.01); *C08K 5/005* (2013.01); *C08K 5/0091* (2013.01); *C08K 5/07* (2013.01); *C08K 5/09* (2013.01); *C08K 5/132* (2013.01); *C08K 5/1345* (2013.01); *C08K 5/20* (2013.01); *C08K 5/23* (2013.01); *C08K 5/315* (2013.01); *C08K 5/3417* (2013.01); *C08K 5/3435* (2013.01); *C08K 5/3437* (2013.01); *C08K 5/3475* (2013.01); *C09J 2301/416* (2020.08); *C09K 2323/035* (2020.08); *G02B 5/3025* (2013.01)

(58) Field of Classification Search
CPC .... G02F 1/133509; G02F 1/1351; C09J 9/00; C09J 133/08; C09J 2203/318; C09K 2323/031
See application file for complete search history.

(56) References Cited

U.S. PATENT DOCUMENTS

| | | | | |
|---|---|---|---|---|
| 2005/0143500 | A1* | 6/2005 | Gugumus | C08K 5/3462 524/99 |
| 2010/0160502 | A1* | 6/2010 | Schambony | C08K 5/34 524/102 |
| 2010/0226016 | A1* | 9/2010 | Hirauchi | G03B 9/02 359/614 |
| 2011/0043486 | A1* | 2/2011 | Hagiwara | G06F 3/042 345/175 |
| 2015/0036074 | A1* | 2/2015 | Park | G02F 1/133308 349/58 |
| 2015/0378069 | A1* | 12/2015 | Yamamoto | B32B 27/08 359/361 |
| 2016/0231972 | A1* | 8/2016 | You | G06F 1/1637 |

FOREIGN PATENT DOCUMENTS

| | | | | |
|---|---|---|---|---|
| KR | 10-2015-0015243 A | | 2/2015 | |
| KR | 10-2017-0073918 A | | 6/2017 | |
| KR | 10-2017-0086780 A | | 7/2017 | |
| KR | 102126057 B1 | * | 6/2020 | ............... G02B 5/30 |
| TW | 1697530 B | * | 7/2020 | ............... G02B 5/30 |

* cited by examiner

POLARIZING PLATE AND OPTICAL DISPLAY INCLUDING THE SAME

CROSS-REFERENCE TO RELATED APPLICATION

This application claims priority to and the benefit of Korean Patent Application No. 10-2017-0183239, filed on Dec. 28, 2017 in the Korean Intellectual Property Office, the entire content of which is incorporated herein by reference.

BACKGROUND

1. Field

One or more aspects of example embodiments of the present disclosure relate to a polarizing plate and an optical display including the same.

2. Description of the Related Art

An optical display includes a display region and a non-display region. The display region is light transmissive and displays an image to be viewed through a screen. The non-display region is positioned along the periphery of the display region and surrounds the display region. The non-display region may include a printed circuit board, a drive chip, and/or the like so that these elements are not visible to a user of an optical display. The non-display region may include a light shielding layer and/or the like.

A recently developed technique for achieving slimness of an optical display includes forming the light shielding layer between a polarizer and a protective film, for example, in a bonding layer. A bonding layer formed of a photocurable bonding agent enables faster curing compared to a bonding layer formed of a water-based adhesive, thereby minimizing or reducing influence (e.g., of the light shielding layer) on the polarizer and the protective film. However, when a polarizer protective film including a light shielding layer formed of a thermosetting composition is bonded to a polarizer using ultraviolet (UV) irradiation of a photocurable bonding agent, the light shielding layer may suffer from cracking or yellowing.

SUMMARY

One or more aspects of example embodiments of the present disclosure are directed toward a polarizing plate (e.g., assembly) that can prevent or reduce a light shielding layer from cracking when bonding a polarizer protective film including the light shielding layer formed thereon to a polarizer using a UV-curable bonding agent through UV irradiation.

One or more aspects of example embodiments of the present disclosure are directed toward a polarizing plate that includes a polarizer and a polarizer protective film including a light shielding layer formed thereon, and can minimize or reduce color value variations in the light shielding layer even after UV irradiation for a long period of time.

One or more aspects of example embodiments of the present disclosure are directed toward a polarizing plate that includes a polarizer and a polarizer protective film including a light shielding layer formed thereon, and can minimize or reduce light shielding variations in the light shielding layer even after UV irradiation for a long period of time.

One or more aspects of example embodiments of the present disclosure are directed toward a polarizing plate in which a light shielding layer has good light shielding efficacy and a high degree of cure, thereby securing good properties in terms of hardness, impact resistance, and scratch resistance.

According to one or more aspects of example embodiments of the present disclosure, a polarizing plate is composed of a display region and a non-display region surrounding the display region. The polarizing plate includes a polarizer; and a bonding layer and a first polarizer protective film sequentially stacked on an upper surface of the polarizer. A light shielding layer is embedded in the bonding layer to constitute at least a portion of the non-display region, and the light shielding layer is on at least one surface of the first polarizer protective film and includes a UV absorbent (material).

In some embodiments, the bonding layer may include or be formed of a UV curable bonding agent.

In some embodiments, the light shielding layer may include or be formed of a thermosetting composition for light shielding layers.

In some embodiments, the UV absorbent may be present inside the light shielding layer and/or on at least one surface of the light shielding layer.

In some embodiments, the UV absorbent may be present in an amount of about 0.05 wt % to about 5 wt % in or on the light shielding layer.

In some embodiments, the UV absorbent may have a maximum absorption wavelength of about 380 nm to about 420 nm.

In some embodiments, the UV absorbent may include at least one selected from benzophenone, triazine, benzotriazole, oxanilide, phenyl salicylate, salicylate, cyanoacrylate, cinnamate, indole, azo, and naphthalene diimide-based UV absorbents.

In some embodiments, the UV absorbent may include at least one selected from a benzophenone-based UV absorbent and a triazine-based UV absorbent.

In some embodiments, the benzophenone-based UV absorbent may include a compound represented by Formula 1:

Formula 1

In Formula 1, $R^1$ may be a $C_1$ to $C_4$ alkyl group; $R^2$ and $R^3$ may each independently be a hydroxyl group, a $C_1$ to $C_8$ alkoxy group, or a halogen; n and m may each independently be an integer of 0 to 5; and n+m may be an integer of 5 or less.

In some embodiments, the triazine-based UV absorbent may include a hydroxy phenyl triazine UV absorbent.

In some embodiments, the light shielding layer may further include a UV stabilizer.

In some embodiments, the UV stabilizer may be present in an amount of about 0.05 wt % to about 3 wt % in the light shielding layer.

In some embodiments, the UV stabilizer may include at least one selected from a hindered amine-based UV stabilizer and a metal complex salt-based UV stabilizer.

In some embodiments, the thermosetting composition for light shielding layers may include a pigment, a binder resin, and/or a heat-curing initiator.

In some embodiments, the pigment may include at least one selected from carbon black and a silver-tin alloy.

In some embodiments, the binder resin may include at least one selected from an acrylic resin, a polyimide resin, and a polyurethane resin.

In some embodiments, the thermosetting composition for light shielding layers may further include a thermosetting unsaturated compound.

In some embodiments, the thermosetting composition for light shielding layers may further include a UV absorbent.

In some embodiments, the light shielding layer may have a thickness of about 5 μm or less.

In some embodiments, the polarizing plate may further include a second polarizer protective film on a lower surface of the polarizer.

In some embodiments, the polarizing plate may have an a* variation (e.g., color change as measured along the a* axis in L*a*b* color space) rate of about 50% or less, as calculated by Equation 1:

$$a^* \text{variation rate} = |(a^*)500 \text{ h} - (a^*)0 \text{ h}|/|(a^*)0 \text{ h}| \times 100, \quad \text{Equation 1}$$

wherein $(a^*)0$ h is an a* value measured on the light shielding layer of the polarizing plate (e.g., prior to irradiation) and $(a^*)500$ h is an a* value measured on the light shielding layer of the polarizing plate after irradiation of the polarizing plate with sunlight for 500 hours.

In some embodiments, the polarizing plate may have a b* variation (e.g., color change as measured along the b* axis in L*a*b* color space) rate of about 200% or less, as calculated by Equation 2:

$$b^* \text{variation rate} = |(b^*)500 \text{ h} - (b^*)0 \text{ h}|/|(b^*)0 \text{ h}| \times 100, \quad \text{Equation 2}$$

wherein $(b^*)0$ h is a b* value measured on the light shielding layer of the polarizing plate (e.g., prior to irradiation) and $(b^*)500$ h is a b* value measured on the light shielding layer of the polarizing plate after irradiation of the polarizing plate with sunlight for 500 hours.

In some embodiments, the polarizing plate may have an optical density (OD) variation rate of about 20% or less, as calculated by Equation 3:

$$\text{OD variation rate} = |(OD)500 \text{ h} - (OD)0 \text{ h}|/(OD)0 \text{ h} \times 100, \quad \text{Equation 3}$$

wherein $(OD)0$ h is an OD value measured on the light shielding layer of the polarizing plate (e.g., prior to irradiation) and $(OD)500$ h is an OD value measured on the light shielding layer of the polarizing plate after irradiation of the polarizing plate with sunlight for 500 hours.

According to one or more aspects of the present disclosure, an optical display includes the polarizing plate according to the present disclosure.

DETAILED DESCRIPTION

Embodiments of the present disclosure will be described in more detail with reference to the accompanying drawings to provide a thorough understanding of the disclosure to those skilled in the art. It should be understood that the present disclosure may be embodied in different ways and is not limited to the following embodiments. In the drawings, portions irrelevant to the description will be omitted for clarity. Like components will be denoted by like reference numerals throughout the specification, and duplicative descriptions thereof may not be provided.

Herein, spatially relative terms such as "upper" and "lower" are defined with reference to the accompanying drawings. Thus, it will be understood that the term "upper surface" can be used interchangeably with the term "lower surface". The thicknesses of layers, films, panels, regions, etc., may be exaggerated in the drawings for clarity. It will be understood that when an element such as a layer or a film is referred to as being "on" another element, it can be directly on the other element, or intervening element(s) may be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure".

A polarizing plate according to one or more embodiments of the present disclosure is composed of a display region and a non-display region surrounding the display region. The polarizing plate includes a polarizer; and a bonding layer and a first polarizer protective film sequentially stacked (e.g., in a thickness direction of the polarizing plate) on one surface of the polarizer. A light shielding layer is embedded in the binding layer to constitute at least a portion of the non-display region. As used herein, the term "embedded" may refer to being directly on or adjacent to a portion of the binding layer in a region defined between the polarizer and the first polarizer protective film. In the polarizing plate according to the present disclosure, the light shielding layer may be embedded in the bonding layer to enable a thickness reduction in the optical display.

The light shielding layer may be formed on at least one surface of the first polarizer protective film, and may include a UV absorbent (material). The bonding layer may include or be formed of a UV curable bonding agent. The UV absorbent can remain even after heat curing of a thermosetting composition to form the light shielding layer. The UV absorbent can prevent or reduce generation of cracks in the light shielding layer due to UV irradiation by absorbing UV light reaching the light shielding layer during UV-cured bonding of the polarizer to the first polarizer protective film including the light shielding layer. In addition, the UV absorbent can minimize or reduce variation in color and/or light shielding effects in the light shielding layer, even after UV irradiation for a long period of time.

Figure 1:
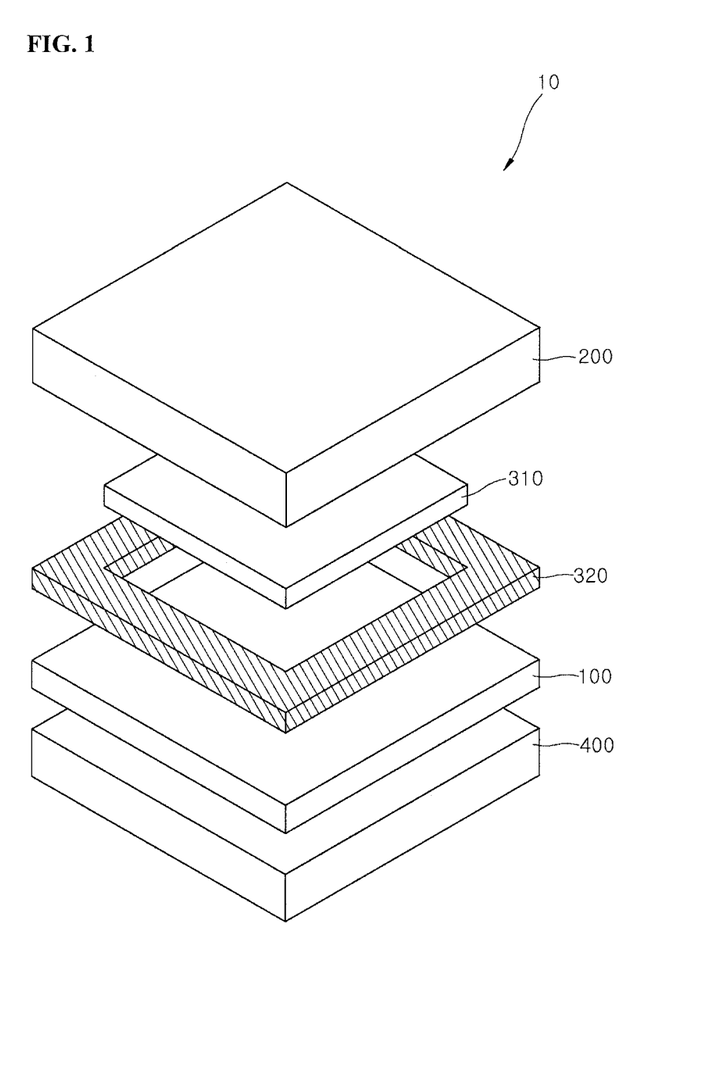
FIG. 1 is a perspective view of a polarizing plate according to one or more embodiments of the present disclosure.

Hereinafter, a polarizing plate according to one or more embodiments of the present disclosure will be described with references to FIGS. 1 and 2. FIG. 1 is a perspective view of a polarizing plate according to one or more embodiments of the present disclosure, and FIG. 2 is a sectional view of the polarizing plate according to one or more embodiments of the present disclosure.

Figure 2:
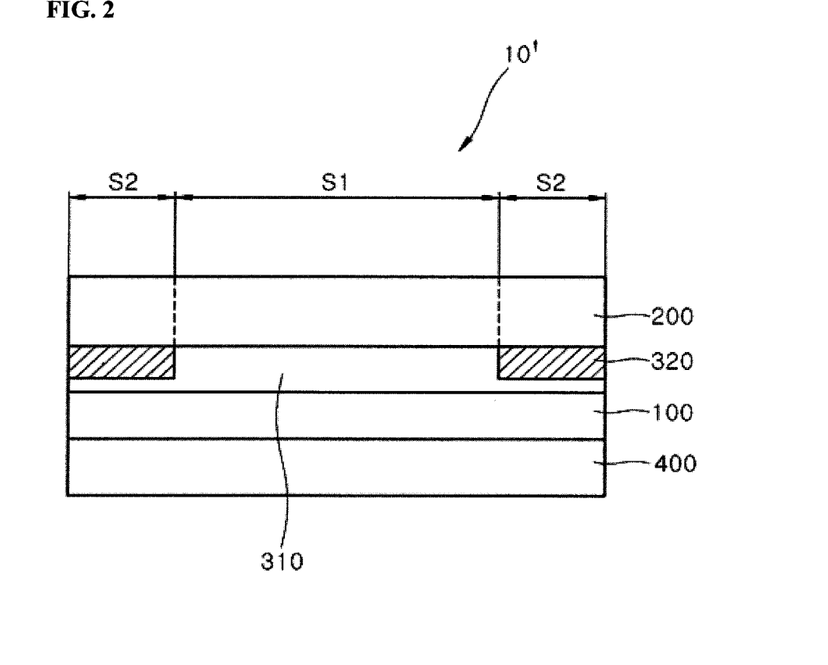
FIG. 2 is a sectional view of the polarizing plate according to one or more embodiments of the present disclosure.

Referring to FIG. 1 and FIG. 2, a polarizing plate 10 (or 10') according to one or more embodiments of the present disclosure may include a polarizer 100, a first polarizer protective film 200 stacked on an upper surface of the polarizer 100 via a bonding layer 310, and a second polarizer protective film 400 stacked on a lower surface of the polarizer 100. A light shielding layer 320 is formed around (and embedded in) the bonding layer 310 and/or on a surface thereof (e.g., on a side surface and/or an upper surface thereof).

In some embodiments, the polarizing plate may further include an adhesive layer on a lower surface of the second polarizer protective film 400. In some embodiments, an additional functional layer may be formed on an upper surface of the first polarizer protective film 200. The functional layer may provide one or more additional functions to the polarizing plate, for example, anti-fingerprint, low reflection, anti-glare, anti-contamination, anti-reflection, diffusion, and/or refraction functions.

The polarizing plate 10 may be a polarizing plate on the viewer's side of an optical display panel. Accordingly, the bonding layer 310 and the first polarizer protective film 200 may be sequentially formed on a surface of the polarizer 100 that transmits light.

Referring to FIG. 2, the polarizing plate 10' is composed of a display region S1 and a non-display region S2 surrounding the periphery of the display region S1. The non-display region S2 may correspond to the light shielding layer 320 shown in FIG. 1. The display region S1 is a light transmitting region, and the non-display region S2 is an opaque region.

The light shielding layer 320 is formed on a surface of the first polarizer protective film 200 so that it is embedded in the bonding layer 310, and/or on one surface thereof (e.g., on a side surface and/or an upper surface thereof). The light shielding layer 320 directly adjoins the bonding layer 310.

As shown in FIG. 1 and FIG. 2, the light shielding layer 320 is formed to surround the periphery of the bonding layer 310. The light shielding layer 320 constitutes at least a portion of the non-display region when the polarizing plate according to the present disclosure is mounted on the optical display.

The light shielding layer 320 may be formed on a light transmitting surface of the polarizer 100. Accordingly, a display function can be realized in the region of the polarizing plate in which the light shielding layer 320 is not formed. Alternatively, in some embodiments, the light shielding layer 320 may be formed on a light incident surface of the polarizer 100.

The thickness of the light shielding layer 320 may be less than or the same as the thickness of the bonding layer 310. FIG. 1 shows a structure in which the light shielding layer 320 has the same thickness as the bonding layer 310. FIG. 2 shows the structure in which the light shielding layer 320 has a smaller thickness than the bonding layer 310. The thickness of the light shielding layer 320 may be about 30% to about 100% of the thickness of the bonding layer 310, or for example, about 50% to about 100% the thickness of the bonding layer 310. Within this thickness range, the light shielding layer 320 can be embedded in the bonding layer and enable reduction in the thickness of the polarizing plate. For example, the light shielding layer 320 may have a thickness of about 5 μm or less, about 0.1 μm to about 5 μm, or about 1 μm to about 4 μm. Within this thickness range, the light shielding layer 320 can be included in the bonding layer, thereby securing the light shielding effects while enabling reduction in the thickness of the polarizing plate.

The light shielding layer 320 may include a UV absorbent. The light shielding layer 320 may include or be formed of a thermosetting composition for light shielding layers. Here, the term "thermosetting composition" may refer to a composition that is able to be thermally set, as well as a composition that has been prepared and/or treated by thermal setting. As described in more detail, the bonding layer 310 may be a photocurable bonding layer formed of a UV curable bonding agent. Accordingly, the light shielding layer containing the UV absorbent can prevent or reduce generation of cracks in the light shielding layer due to UV irradiation during UV-cured bonding of the polarizer to the first polarizer protective film including the light shielding layer, and can secure reliable color values (e.g., as expressed in terms of a* or b* color change in L*a*b* color space) and light shielding effects (e.g., OD (optical density)) of the light shielding layer even after UV irradiation for a long period of time.

In one or more embodiments, the polarizing plate may have an a* variation rate of about 50% or less, for example, about 30% or less, as calculated by Equation 1, and a b* variation rate of about 200% or less, for example, about 120% or less, as calculated by Equation 2. Within these ranges, the polarizing plate may secure reliability by minimizing or reducing color value variations even after UV irradiation for a long period of time.

$$a^{*}\text{variation rate}=|(a^{*})500\text{ h}-(a^{*})0\text{ h}|/|(a^{*})0\text{ h}|\times 100, \quad \text{Equation 1}$$

wherein $(a^*)0\text{ h}$ is an a* value measured on the light shielding layer of the polarizing plate (e.g., prior to irradiation) and $(a^*)500\text{ h}$ is an a* value measured on the light shielding layer of the polarizing plate after irradiation of the polarizing plate with sunlight for 500 hours.

$$b^{*}\text{variation rate}=|(b^{*})500\text{ h}-(b^{*})0\text{ h}|/|(b^{*})0\text{ h}|\times 100, \quad \text{Equation 2}$$

wherein $(b^*)0\text{ h}$ is a b* value measured on the light shielding layer of the polarizing plate (e.g., prior to irradiation) and $(b^*)500\text{ h}$ is a b* value measured on the light shielding layer of the polarizing plate after irradiation of the polarizing plate with sunlight for 500 hours.

In Equation 1, (a*)500 h may be about 0.1 or more, for example, about 0.2 to about 1.5. In Equation 2, (b*)500 h may be about −0.4 or more, for example, about −0.3 to about 1.5, or about −0.2 to about 1.5. Within these ranges, the polarizing plate may be used even after UV irradiation for a long period of time.

In one or more embodiments, the polarizing plate may have an OD variation rate of about 20% or less, for example, about 10% or less, as calculated by Equation 3. Within these ranges, the polarizing plate my secure reliability by minimizing or reducing color value variations even after UV irradiation for a long period of time.

$$\text{OD variation rate}=|(OD)500\text{ h}-(OD)0\text{ h}|/(OD)0\text{ h}\times 100, \quad \text{Equation 3}$$

wherein $(OD)0\text{ h}$ is an OD value measured on the light shielding layer of the polarizing plate (e.g., prior to irradiation) and $(OD)500\text{ h}$ is an OD value measured on the light shielding layer of the polarizing plate after irradiation of the polarizing plate with sunlight for 500 hours.

In Equation 3, (OD)500 h may be about 2 or more, for example, about 2 to about 5, or about 3 to about 5. Within these ranges, the polarizing plate may be used even after UV irradiation for a long period of time.

The UV absorbent may include a UV absorbing material having a maximum absorption wavelength of about 380 nm to about 420 nm. Within this range of maximum absorption wavelength, the UV absorbent can prevent or reduce generation of cracks in the light shielding layer even after UV irradiation (for curing of the bonding agent), and can secure reliable color values and light shielding effects of the light shielding layer even after UV irradiation for a long period of time. Herein, the "maximum absorption wavelength" is a value measured on the UV absorbent in 5 mg/L (5 wt %) of methylethylketone as a solvent.

The UV absorbent may be selected from any UV absorbent material having a maximum absorption wavelength within this range. For example, the UV absorbent material may include at least one selected from benzophenone-based absorbents (such as a hydroxy benzophenone UV absorbent); triazine-, benzotriazole-, oxanilide-, phenyl salicylate-, salicylate-, cyanoacrylate-, cinnamate-, indole-, azo-, and naphthalene diimide-based UV absorbents. For example, the UV absorbent may include at least one selected from an indole-, azo-, naphthalene diimide-, triazine-, and/or benzophenone-based UV absorbent. For example, the UV absorbent may include at least one selected from a triazine- and a benzophenone-based UV absorbent.

In one or more embodiments, the benzophenone-based UV absorbent may include a compound represented by Formula 1:

Formula 1

In Formula 1, $R^1$ may be a $C_1$ to $C_4$ alkyl group; $R^2$ and $R^3$ may each independently be a hydroxyl group, a $C_1$ to $C_8$ alkoxy group, or a halogen; n and m may each independently be an integer of 0 to 5; and n+m may be an integer of 5 or less.

The benzophenone UV absorbent may be a commercially available product, for example, LOWILITE UV absorber series (for example: LOWILITE 20, Addivant, Danbury, DT).

In one or more embodiments, the triazine UV absorbent may include a compound represented by Formula 2:

Formula 2

In Formula 2, $R_1$, $R_2$, and $R_3$ may each independently be hydrogen or a substituted or unsubstituted phenyl group. In Formula 2, at least one hydrogen atom of the phenyl group may be substituted with a hydroxyl group; a $C_1$ to $C_{15}$ alkyl group; a $C_1$ to $C_{15}$ alkoxy carbonyl group; an unsubstituted $C_1$ to $C_{15}$ alkoxy group; a $C_1$ to $C_{15}$ alkoxy group having a $C_1$ to $C_{15}$ alkoxy carbonyl group, a halogen, a hydroxyl group, or a $C_1$ to $C_{15}$ alkyl group; a $C_2$ to $C_{24}$ alkenyl group; a $C_6$ to $C_{24}$ aryl group; a $C_5$ to $C_{24}$ cycloalkyl group; or a $C_7$ to $C_{24}$ aralkyl group. Herein, the term "$C_1$ to $C_{15}$ alkoxy-carbonyl group" may refer to *—C(=O)O—R (where * is a linking site and R is a $C_1$ to $C_{15}$ alkyl group).

In one or more embodiments, the triazine UV absorbent may be a hydroxyl phenyl triazine. The triazine UV absorbent may be a commercially available product, for example, Tinuvin UV absorbent series (for example: Tinuvin 477, BASF, Ludwigshafen, Germany).

In one or more embodiments, the benzotriazole UV absorbent may include a compound represented by Formula 3:

Formula 3

In Formula 3, $R^1$ may be hydrogen or a halogen atom; $R^2$ may be a $C_1$ to $C_5$ alkyl group, a $C_2$ to $C_{10}$ alkenyl group, or a $C_3$ to $C_{10}$ cycloalkyl group, each of the $C_1$ to $C_5$ alkyl group, the $C_2$ to $C_{10}$ alkenyl group, and the $C_3$ to $C_{10}$ cycloalkyl group being capable of being substituted with a $C_1$ to $C_5$ alkyl group, a $C_2$ to $C_{10}$ alkenyl group, a halogen, a $C_6$ to $C_{10}$ aryl group, or a $C_3$ to $C_{10}$ heteroaryl group; and $R^3$ may be a $C_1$ to $C_5$ alkyl group or a $C_1$ to $C_5$ alkoxy group, each of the $C_1$ to $C_5$ alkyl group and the $C_1$ to $C_5$ alkoxy group being capable of being substituted with a $C_1$ to $C_5$ alkyl group, a $C_2$ to $C_{10}$ alkenyl group, a halogen, a $C_6$ to $C_{10}$ aryl group, or a $C_3$ to $C_{10}$ heteroaryl group.

In one or more embodiments, the indole-based UV absorbent may include a compound represented by Formula 4:

Formula 4

In Formula 4, $R^1$ may be hydrogen or a substituted or unsubstituted $C_1$ to $C_{10}$ alkyl group;
$R^2$ may be hydrogen or a substituted or unsubstituted $C_6$ to $C_{20}$ aryl group;
$R^3$ may be hydrogen or a substituted or unsubstituted $C_1$ to $C_{10}$ alkyl group;
$R^4$ may be hydrogen, a cyano group (CN) or a substituted or unsubstituted $C_1$ to $C_{10}$ alkyl group; and
$R^5$ may be a cyano group or —(C=O)O—$R^6$ (where $R^6$ may be a substituted or unsubstituted $C_1$ to $C_{10}$ alkyl group or a substituted or unsubstituted $C_6$ to $C_{20}$ aryl group). Herein, unless otherwise specifically stated, the term "substituted" indicates that at least one hydrogen atom of a functional group is substituted with a $C_1$ to $C_5$ alkyl group, a $C_2$ to $C_{10}$ alkenyl group, a halogen, a $C_6$ to $C_{10}$ aryl group, or a $C_3$ to $C_{10}$ heteroaryl group.

For example, $R^1$ may be a $C_1$ to $C_5$ alkyl group, such as a methyl group; $R^2$ may a $C_6$ to $C_{10}$ aryl group, such as a phenyl group; $R^3$ may be hydrogen or a $C_1$ to $C_5$ alkyl group, such as hydrogen; $R^4$ may be a cyano group; and $R^5$ may be a cyano group or —(C=O)—O—$R^6$ (where $R^6$ is a substituted or unsubstituted $C_1$ to $C_5$ alkyl group). In some embodiments, the compound represented by Formula 4 may include a compound represented by Formula 4-1 or a compound represented by Formula 4-2:

Formula 4-1

Formula 4-2

In one or more embodiments, the azo-based UV absorbent may include a compound represented by Formula 5:

Formula 5

In Formula 5, $R^6$ to $R^{15}$ may each independently be hydrogen, a substituted or unsubstituted $C_1$ to $C_{10}$ alkyl group, a substituted or unsubstituted $C_6$ to $C_{20}$ aryl group, a substituted or unsubstituted $C_3$ to $C_{10}$ cycloalkyl group, a substituted or unsubstituted $C_7$ to $C_{20}$ arylalkyl group, a substituted or unsubstituted $C_2$ to $C_{10}$ heteroaryl group, a halogen atom, —OH, an amino group (-$NH_2$), or —SH; where at least one selected from $R^6$ to $R^{15}$ is an amino group (-$NH_2$).

For example, $R^8$ may be an amino group, and $R^6$, $R^7$, $R^9$, $R^{10}$, $R^{11}$, $R^{12}$, $R^{13}$, $R^{14}$, and $R^{15}$ may each independently be hydrogen. The azo-based UV absorbent may be a commercially available product, for example, DD-7 (Wookseung Chemistry Co. Ltd., Gyeonggi, Korea).

In one or more embodiments, the naphthalene imide-based UV absorbent may include a compound represented by Formula 6:

Formula 6

In Formula 6, $R^{17}$ and $R^{18}$ may each independently be hydrogen, a substituted or unsubstituted $C_1$ to $C_{10}$ alkyl group, a substituted or unsubstituted $C_6$ to $C_{20}$ aryl group, a substituted or unsubstituted $C_3$ to $C_{10}$ cycloalkyl group, a substituted or unsubstituted $C_7$ to $C_{20}$ arylalkyl group, a substituted or unsubstituted $C_2$ to $C_{10}$ heteroaryl group, a halogen atom, —OH, an amino group, or -SH. The naphthalene imide-based UV absorbent may be a commercially available product, for example, S-Yellow 500 grade (Wookseung Chemistry Co. Ltd., Gyeonggi, Korea).

The UV absorbent may be present in an amount of about 0.05 wt % to about 5 wt % in or on the light shielding layer. Within this range, the UV absorbent may suppress generation of cracks in the light shielding layer without adversely affecting the light shielding effect of the light shielding layer. For example, the UV absorbent may be added in an amount of about 0.05 wt % to about 3 wt %.

The light shielding layer may further include a UV stabilizer. In some embodiments, even a small amount of the UV stabilizer may promote the crack-suppressing function of the UV absorbent in the light shielding layer upon UV irradiation. The UV stabilizer may include at least one selected from a hindered amine (HLAS) based UV stabilizer and a metal complex salt-based UV stabilizer, but embodiments of the present disclosure are not limited thereto.

The UV stabilizer may be present in an amount of about 0.05 wt % to about 3 wt %, for example, about 0.05 wt % to about 2 wt %, in the light shielding layer. Within this range, the composition for light shielding layers can improve the effect of suppressing crack generation in the light shielding layer upon UV irradiation without adversely affecting the light shielding effect.

Each of the UV absorbent and the UV stabilizer may be present inside the light shielding layer 320 or on at least one surface of the light shielding layer 320. For example, each of the UV absorbent and the UV stabilizer may be present on at least one surface of the light shielding layer 320.

In one or more embodiments, the UV absorbent and the UV stabilizer may be contained in the thermosetting composition for light shielding layers. In some embodiments, a coating layer including the UV absorbent and the UV stabilizer may be formed on at least one surface of the light shielding layer.

The light shielding layers may be formed from a thermosetting composition that may include a pigment, a binder resin, a heat-curing initiator, and/or a UV absorbent. The light shielding layer may be formed of the composition for light shielding layers to generate a thinner structure. The composition for light shielding layers may further include a solvent. The composition for light shielding layers may further include a thermosetting unsaturated compound. The composition for light shielding layers may further include a UV stabilizer.

The pigment may include carbon black, a mixed pigment of silver-tin alloys, or a combination thereof. Non-limiting examples of carbon black may include graphite, furnace black, acetylene black, and Ketjen black. The pigment may be present in the form of a pigment dispersion, but embodiments of the present disclosure are not limited thereto.

The binder resin may include an acrylic resin, a polyimide resin, a polyurethane resin, or a combination thereof. The acrylic resin may include methacrylic acid/benzyl methacrylate copolymer, methacrylic acid/benzyl methacrylate/styrene copolymer, methacrylic acid/benzyl methacrylate/2-hydroxyethylmethacrylate copolymer, methacrylic acid/benzyl methacrylate/styrene/2-hydroxyethylmethacrylate copolymer, and/or the like. The polyurethane resin may be an aliphatic polyurethane resin. The acrylic resin may be a pressure sensitive adhesive resin. However, it should be understood that embodiments of the present disclosure are not limited thereto.

The thermosetting unsaturated compound may be a compound having a lower weight average molecular weight than the binder resin. Non-limiting examples of the thermosetting unsaturated compound may include, ethylene glycol diacrylate, ethylene glycol dimethacrylate, diethylene glycol diacrylate, triethylene glycol diacrylate, triethylene glycol dimethacrylate, 1,6-hexanediol diacrylate, 1,6-hexanediol dimethacrylate, pentaerythritol tri(meth)acrylate, pentaerythritol tetra(meth)acrylate, dipentaerythritol penta(meth)acrylate, dipentaerythritol hexa(meth)acrylate, bisphenol A epoxy (meth)acrylate, ethylene glycol monomethylether (meth)acrylate, trimethylolpropane tri(meth)acrylate, and tris(meth)acryloyloxyethyl phosphate.

The heat-curing initiator may include at least one selected from, for example, hydrazide compounds (such as 1,3-bis(hydrazinocarbonoethyl-5-isopropylhydantoin)); imidazole derivatives (such as 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hydroxymethylimidazole, and 2-phenyl-4,5-dihydroxymethylimidazole); acid anhydrides (such as tetrahydrophthalic acid and ethylene glycol-bis(anhydrotrimellitate)); melamine compounds; guanidine compounds; dicyandiamides; and modified aliphatic polyamines.

The solvent may include glycol ethers (such as ethylene glycol methylether, ethylene glycol ethylether, propylene glycol methylether, and/or the like); cellosolve acetates (such as methyl cellosolve acetate, ethyl cellosolve acetate, diethyl cellosolve acetate, and/or the like); carbitols (such as methylethyl carbitol, diethyl carbitol, diethylene glycol monomethylether, diethylene glycol monoethylether, diethylene glycol dimethylether, diethylene glycol methylethylether, diethylene glycol diethylether, and/or the like); and/or propylene glycol alkylether acetates (such as propylene glycol methylether acetate, propylene glycol propylether acetate, and/or the like), but embodiments of the present disclosure are not limited thereto.

In one or more embodiments, the composition for light shielding layers may include 1 wt % to 50 wt % of the pigment (or the pigment dispersion), 0.5 wt % to 20 wt % of the binder resin, 0.1 wt % to 10 wt % of the heat-curing initiator, about 0.05 wt % to about 5 wt % of the UV absorbent, and the balance (e.g., remaining wt %) of the solvent. Within this range, the composition may secure formation of a light shielding layer having a thin (e.g., suitably low) thickness while providing a good light shielding effect.

In some embodiments, the composition for light shielding layers may include 1 wt % to 50 wt % of the pigment (or the pigment dispersion), 0.5 wt % to 20 wt % of the binder resin, 1 wt % to 20 wt % of the reactive unsaturated compound, 0.1 wt % to 10 wt % of the heat-curing initiator, about 0.05 wt % to about 5 wt % of the UV absorbent, and the balance of the solvent. Within this range, the composition can secure formation of the light shielding layer 320 having a thin thickness while providing a good light shielding effect.

The composition for light shielding layers may further include 0.1 wt % to 1 wt % of other additives. The other additives may include a silane coupling agent to improve bonding strength between the light shielding layer 320 and the polarizer protective film.

The light shielding layer may be formed by heat-curing the composition for light shielding layers. Deposition of the composition for light shielding layers may be performed using any suitable method. For example, the composition for light shielding layers may be deposited by gravure coating, spin coating, and/or the like, but embodiments of the present disclosure are limited thereto. Heat curing may be performed at, for example, about 70° C. to about 110° C. for about 0.5 minutes to about 5 minutes.

The light shielding layer 320 may have a printed pattern.

Figure 3:
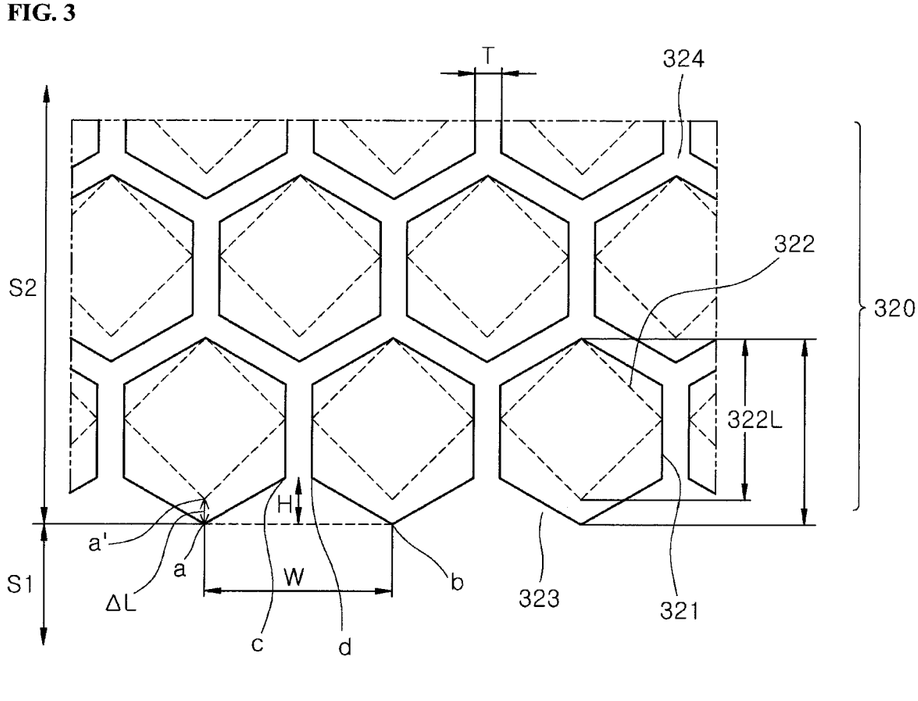
FIG. 3 is a partially enlarged view of a printed pattern on a light shielding layer according to one or more embodiments of the present disclosure.
Figure 4:
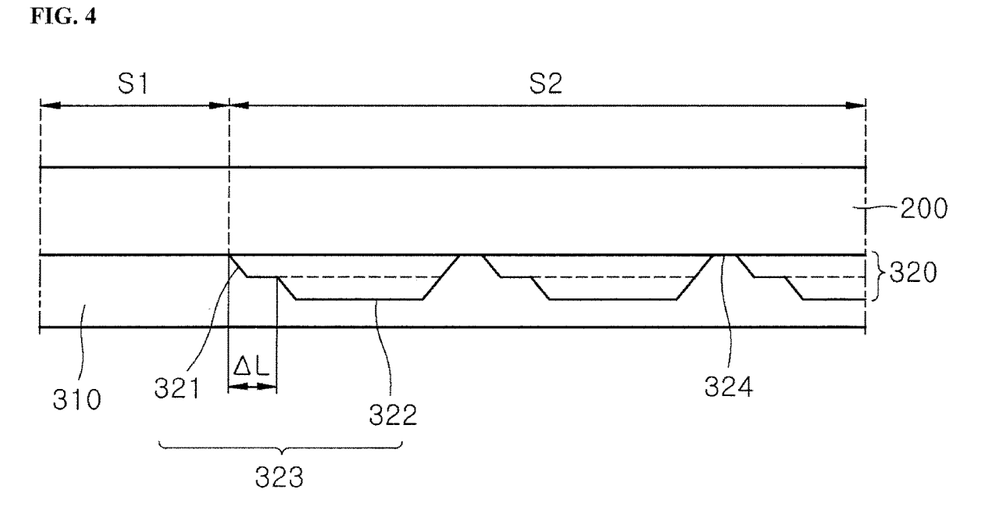
FIG. 4 is a partial cross-sectional view of the printed pattern on the light shielding layer according to one or more embodiments of the present disclosure.

The printed pattern of the light shielding layer 320 will be described in more detail with reference to FIG. 3 and FIG. 4. FIG. 3 is an enlarged view of a printed pattern of the light shielding layer at an interface between the display region S1 and the non-display region S2 in the polarizing plate of FIG. 2. FIG. 4 is a sectional view of the printed pattern of the light shielding layer at an interface between the display region S1 and the non-display region S2 in the polarizing plate of FIG. 2.

Referring to FIG. 3 and FIG. 4, the light shielding layer 320 may include a printed region composed of a plurality of printed patterns 323. The remaining region 324 of the light shielding layer 320 excluding the printed region is a non-printed region. The printed patterns 323 are separated from each other. The printed patterns 323 include a first printed layer 321 and a second printed layer 322 formed on the first printed layer 321. The second printed layer 322 may be directly formed on the first printed layer 321. The second printed layer 322 may have a different pattern shape than the first printed layer 321. For example, the second printed layer 322 may have a smaller area than the first printed layer 321. When a point at which one first printed layer adjoins the interface between the display region and the non-display region is indicated by Point a and the closest point of the second printed layer to the interface between the display region and the non-display region is indicated by Point a', the shortest distance ΔL between Point a and Point a' may be about 200 μm or less, for example, about 0.1 μm to about 200 μm, or about 10 μm to about 200 μm. Within this range of ΔL, the light shielding layer can secure light shielding effects, and uniformity between the display region and the non-display region can be improved to reduce a visibility difference therebetween while suppressing or reducing pixel RGB visibility upon operation of an optical display. Particularly, according to the present disclosure, two printed patterns are stacked in a bilayer structure while adjusting the shortest distance ΔL in the light shielding layer, as shown in FIG. 3 and FIG. 4, thereby securing the light shielding effect while preventing or reducing pixel RGB visibility through improvement in uniformity between the display region and the non-display region to reduce a visibility difference therebetween. As used herein, the term "interface between the display region and the non-display region" refers to an (imaginary) line or boundary connecting points of the first printed layers formed in the non-display region that are closest to the display region.

In one or more embodiments, a difference in length between a maximum major axis 321L of the first printed layer 321 and a maximum major axis 322L of the second printed layer 322 may be about 200 μm or less, for example, about 0.1 μm to about 200 μm, or about 10 μm to about 200 μm. Within this range, the light shielding layer can secure the light shielding effect, and uniformity between the display region and the non-display region can be improved to reduce a visibility difference therebetween while preventing or reducing pixel RGB visibility. For example, according to the present disclosure, two printed patterns having the same major axis length are stacked in a bilayer structure in the light shielding layer while adjusting the difference in length between the printed patterns in the light shielding layer, as shown in FIG. 3 and FIG. 4, thereby securing the light shielding effect while improving uniformity between the display region and the non-display region to reduce a visibility difference therebetween while preventing or reducing pixel RGB visibility during operation of the optical display. The maximum major axis 321L of the first printed layer 321 may have a length of about 50 μm to about 600 μm, for example, about 100 μm to about 500 μm, and the maximum major axis 322L of the second printed layer 322 may have a length of about 50 μm to about 500 μm, for example, about 50 μm to about 350 μm.

Since the first printed layer 321 has a different shape than the second printed layer 322, the printed patterns 323 may be formed by printing the first printed layer 321, followed by printing the second printed layer 322 thereon. Although the first printed layer and the second printed layer may be formed at the same time using a single mold, there may be problems of difficulty in mold processing and unclearness of pattern shapes. Although it is desirable that the printed patterns be parallel to each other, a rounded surface may be formed when the second printed layer 322 is formed on the first printed layer 321. According to the present disclosure, the difference in length between the maximum major axis 321L of the first printed layer 321 and the maximum major axis 322L of the second printed layer 322 and the shortest distance Δ L are set to about 200 μm or less, for example, about 0.1 μm to about 200 μm, or about 10 μm to about 200 μm, in order to improve uniformity between the display region and the non-display region so as to reduce a visibility difference therebetween while preventing or reducing pixel RGB visibility even when a rounded surface is formed between the first printed layer 321 and the second printed layer 322.

Referring to FIG. 3, the first printed layer 321 may have a hexagonal shape and the second printed layer 322 may have a rhombic shape. However, embodiments of the present disclosure are not limited thereto. For example, the first printed layer may have an n-gonal shape (n being an integer of 3 to 10) such as a hexagonal shape, a circular shape, an elliptical shape, an amorphous shape, and/or the like, and the second printed layer may have an n-gonal shape (n being an integer of 3 to 10) such as a pentagonal, hexagonal, or heptagonal shape, a circular shape, an elliptical shape, an amorphous shape, and/or the like.

The sides constituting the first printed layer 321 may have the same length or different lengths, and in some embodiments, may have a length of about 10 μm to about 400 μm, for example, about 50 μm to about 300 μm. The sides constituting the second printed layer 322 may have the same length or different lengths, and in some embodiments, may have a length of about 10 μm to about 400 μm, for example, about 50 μm to about 300 μm.

In one or more embodiments, the length of one side constituting the first printed layer 321 may be the same as or different from the length of one side constituting the second printed layer 322. For example, the length of one side constituting the first printed layer 321 may be the same as the length of one side constituting the second printed layer 322.

In one or more embodiments, the first printed layer 321 may have a regular hexagonal shape and may be arranged in a honeycomb shape, and the second printed layer 322 may have a rhombus or square shape.

The second printed layer 322 may have a smaller area than the first printed layer 321. With this structure, the second printed layer 322 can be formed on the first printed layer 321. For example, a ratio of the area of the first printed layer 321 to the area of the second printed layer 322 may be greater than 1, for example, greater than about 100% to about 3,000%. Within this range, uniformity between the display region and the non-display region can be improved, thereby reducing a visibility difference therebetween while preventing or reducing pixel RGB visibility.

In one or more embodiments, the number of intersection points between the first printed layer 321 and the second printed layer 322 may be at least two, for example, three or more. As used herein, the term "intersection point" may refer to a point of intersection (e.g., crossing or overlapping) of the periphery of the first printed layer 321 and the periphery of the second printed layer 3222, as shown in FIG. 3. When the number of intersection points is within this range, the light shielding layer can secure high uniformity between the display region and the non-display region, thereby reducing a visibility difference therebetween while preventing or reducing pixel RGB visibility.

Referring to FIG. 3, a point at which one first printed layer 321 adjoins the interface between the display region S1 and the non-display region S2 is indicated by Point a, and a point at which another first printed layer 321 adjacent to the one first printed layer 321 adjoins the interface between the display region S1 and the non-display region S2 is indicated by Point b. The closest vertex or inflection point of the one first printed layer 321 to Point a is indicated by Point c, the closest vertex or inflection point of the other first printed layer 321 to Point b is indicated by Point d, and a minimum distance from the interface between the display region S1 and the non-display region S2 to Point c and/or Point d is indicated by H. Here, H may be about 200 μm or less, for example, about 0.1 μm to about 200 μm, or about 5 μm to about 200 μm. Within this range of H, the light shielding layer can secure the light shielding effect and substantial uniformity between the display region and the non-display region can be improved to reduce a visibility difference therebetween while preventing or reducing pixel RGB visibility during operation of an optical display.

In one or more embodiments, the printed patterns may satisfy Relation 4:

$$\text{About } 0.1 \times W \leq H \text{ about } 0.5 \times W. \qquad \text{Relation 4}$$

Relation 4 is selected to secure uniformity at the interface between the display region and the non-display region in order to secure substantial uniformity of the first printed layer directly adjoining the interface between the display region and the non-display region. W is the minimum distance between point A and point B, and may range from about 10 μm to about 500 μm, for example, about 10 μm to about 490 μm. For example, W may be greater than H (W>H).

In one or more embodiments, the first printed layer may have a regular hexagonal shape and may be arranged in a honeycomb shape, and the second printed layer may have a rhombus, square, or regular hexagonal shape.

The printed patterns 323 are separated from each other. A separation distance T between the printed patterns 323 may be about 1 μm to about 50 μm, for example, about 5 μm to about 30 μm. Within this range, the light shielding layer 320 can provide the light shielding effect without adversely affecting uniformity.

The light shielding layer 320 may include a partially open space between the polarizer 100 and the first polarizer protective film 200. That is, the light shielding layer 320 may have a closed loop shape and may include a partially empty interior space. Accordingly, the "interior space" of the light shielding layer 320 may be defined as an empty space inside the light shielding layer 320, which constitutes a closed polygonal shape. The light shielding layer 320 may be on a portion or the entirety of an outer periphery of each of the polarizer 100 and the first polarizer protective film 200 in horizontal cross-sectional view. However, it should be understood that embodiments of the present disclosure are not limited thereto.

Referring to FIG. 3 and FIG. 4, the first printed layer 321 and the second printed layer 322 may have a thickness of less than about 5 μm, for example, about 0.1 μm to less than about 5 μm, and may have the same thickness or different thicknesses. Within this thickness range, the first and second printed layers can be incorporated into the bonding layer, secure the light shielding effect, and achieve thickness reduction of the polarizing plate.

FIG. 3 and FIG. 4 show the bilayer structure of the printed patterns including the first printed layer and the second printed layer. However, it should be understood that embodiments of the present disclosure are not limited thereto, and the printed patterns may have a monolayer structure or a multilayer structure of two or more layers.

FIG. 3 and FIG. 4 show a structure wherein the first printed layer is directly formed on the first polarizer protective film. In some embodiments, the polarizing plate may further include another printed layer on a lower surface of the first printed layer, that is, between the first polarizer protective film and the first printed layer.

The bonding layer 310 is interposed between the polarizer 100 and the first polarizer protective film 200 to bond the polarizer 100 to the first polarizer protective film 200. The bonding layer 310 is directly formed on each of the polarizer 100 and the first polarizer protective film 200.

The bonding layer 310 may be formed on at least one surface of each of the polarizer 100 and the first polarizer protective film 200. That is, the polarizer 100 and the first polarizer protective film 200 may face each other and have substantially the same area in horizontal cross-sectional view. That is, the polarizer 100 and the protective film 200 may completely overlap each other in horizontal cross-sectional view. Specifically, the bonding layer 310 may be formed on at least part of the polarizer 100 and the first polarizer protective, film 200. More specifically, the bonding layer 310 may have an island shape only at the center of polarizer 100 and the first polarizer protective film 200 excluding the peripheries thereof.

The bonding layer 310 may directly adjoin the light shielding layer 320, such that the light shielding layer 320 can be stably formed inside the polarizing plate 10.

The bonding layer 310 serves to bond or couple the polarizer 100 and the first polarizer protective film 200 to each other, and may be formed of a photocurable bonding agent. The photocurable bonding agent may be a UV-curable bonding agent. The photocurable bonding agent may include at least one selected from an epoxy resin, a monomer and/or oligomer of an epoxy resin, a (meth)acrylate resin, and a monomer and/or oligomer of a (meth)acrylate resin. The photocurable bonding agent may further include at least one selected from a photopolymerization radical initiator and a photocationic initiator. Details of the epoxy resin, the (meth) acrylate resin, the photopolymerization initiator, and the photocationic initiator are understood by those skilled in the art.

The bonding layer 310 may have a thickness of about 2 μm to about 5 μm. When the thickness of the bonding layer falls within this range, a gap generated between the polarizer 100 and the first polarizer protective film 200 due to the light shielding layer 320 can be filled with the bonding layer, thereby improving durability of the polarizing plate. That is, the bonding layer 310 can minimize or reduce deviation between a region in which the light shielding layer 320 is present and a region in which the light shielding layer 320 is not present between the polarizer 100 and the first polarizer protective film 200.

The first polarizer protective film 200 may be formed on one surface of the bonding layer 310 to support the bonding layer 310 and the polarizer 100. The first polarizer protective film 200 may be an optically transparent protective film. For example, the first polarizer protective film may be formed of at least one selected from polyesters (such as polyethylene terephthalate (PET), polybutylene terephthalate, polyethylene naphthalate, and polybutylene naphthalate), acryl, cyclic olefin polymer (COP), cellulose esters (such as triacetylcellulose (TAC)), polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide.

The first polarizer protective film 200 may have a thickness of about 30 μm to about 120 μm, for example, about 20 μm to about 80 μm. Within this thickness range, the first polarizer protective film can be used for an optical display.

The first polarizer protective film 200 may be an isotropic film or a retardation film. The isotropic film may have an in-plane retardation (Re) of about 5 nm or less at a wavelength of 550 nm, as represented by Re=(nx−ny)×d, where nx and ny are indices of refraction on the slow axis and the fast axis of the protective film at a wavelength of 500 nm, respectively, and d is the thickness of the protective film. The retardation film may have an in-plane retardation (Re) of greater than about 5 nm, for example, about 10 nm to about 15,000 nm, at a wavelength of 550 nm.

The second polarizer protective film 400 may have the same or different characteristics than the first polarizer protective film 200 in terms of material, thickness, retardation, and/or the like.

The polarizer 100 is formed on a lower surface of the bonding layer 310 to polarize incident light. The polarizer 100 may include a polarizer. The polarizer may include any suitable polarizer available in the art. For example, the polarizer may include a polyvinyl alcohol-based polarizer obtained by uniaxially stretching a polyvinyl alcohol film, or a polyene-based polarizer obtained by dehydrating a polyvinyl alcohol film. The polarizer may have a thickness of about 5 μm to about 40 μm. Within this range, the polarizer can be used for an optical display.

One or more embodiments of the present disclosure provide an optical display including the polarizing plate according to embodiments of the present disclosure as described above. The optical display may include a liquid crystal display, a light emitting display including an organic light emitting diode display, and/or the like. The polarizing plate may be positioned on the viewer side of the liquid crystal display.

One or more embodiments of the present disclosure provide a polarizing plate that can prevent or reduce a light shielding layer from cracking during UV-cured bonding of the polarizer to the first polarizer protective film including the light shielding layer formed thereon.

One or more embodiments of the present disclosure provide a polarizing plate that includes a polarizer and a polarizer protective film including a light shielding layer formed thereon, and can minimize or reduce variation of color values of the light shielding layer even after UV irradiation for a long period of time.

One or more embodiments of the present disclosure provide a polarizer and a polarizing plate that includes a polarizer protective film including a light shielding layer formed thereon, and can minimize or reduce variation of light shielding properties of the light shielding layer even after UV irradiation for a long period of time.

One or more embodiments of the present disclosure provide a polarizing plate, in which a light shielding layer has a good light shielding effect and a high degree of cure, thereby securing good properties in terms of hardness, impact resistance and scratch resistance.

Next, the present disclosure will be described in more detail with reference to some examples. It will be understood that these examples are provided for illustration only, and are not to be construed in any way as limiting the present disclosure.

Preparative Example 1 to Preparative Example 5

A pigment dispersion (A) (pigment content: 30 wt %) was prepared by mixing: 1) a pigment dispersion (A-1) containing a silver-tin alloy (TMP-DC-1, Sumitomo Osaka Cement Co., Ltd., Osaka, Japan) (solid content: 30%, weight ratio of silver to tin=7:3), and 2) a pigment dispersion (A-2) containing carbon black (CI-M-050, Sakata Co., Ltd., Tokyo, Japan) in (to) a ratio as listed in Table 1. An acrylic pressure-sensitive adhesive resin (WA-9263, Wooin ChemTech Co., Ltd., Chungcheongbuk, Korea) (B2) was used as a binder resin (B). A melamine curing agent (M60, Wooin ChemTech Co., Ltd., Chungcheongbuk, Korea) was used as a heat-curing initiator (C). LOWILITE 20 (2-hydroxy-4-methoxybenzophenone, Miwon Specialty Chemical Co., Ltd., Gyeonggi, Korea) (D1) and/or triazine Tinuvin 477 (BASF, Ludwigshafen, Germany) (D-2) was used as a UV absorbent (D), and Tinuvin 292 (HALS-based, BASF) was used as a UV stabilizer (D-3). Propylene glycol methylether acetate was used as a solvent (E); and a silane coupling agent (765 W, Tego Co., Ltd., Waltham, MA) was used as a silane coupling agent (F).

Compositions for light shielding layers were prepared by mixing the pigment dispersion (A), the binder resin (B), the heat-curing initiator (C), the UV absorbent (D-1 and/or D-2), the UV stabilizer (D-3), the solvent (E), and the silane coupling agent (F) described above in the wt % amounts listed in Table 1.

TABLE 1

| | (unit: wt %) | | | | | | | | |
|---|---|---|---|---|---|---|---|---|---|
| | A | | | | D | | | | |
| | A-1 | A-2 | B | C | D-1 | D-2 | D-3 | E | F |
| Preparative Example 1 | 19 | 10 | 19 | 3 | 2 | 0 | 0 | 46 | 1 |
| Preparative Example 2 | 19 | 10 | 19 | 3 | 1 | 0 | 0.5 | 46.5 | 1 |
| Preparative Example 3 | 19 | 10 | 19 | 3 | 0 | 2 | 0 | 46 | 1 |
| Preparative Example 4 | 19 | 10 | 19 | 3 | 0 | 1 | 0.5 | 46.5 | 1 |
| Preparative Example 5 | 19 | 10 | 20 | 3 | 0 | 0 | 0 | 47 | 1 |

Example 1

A first printed layer was formed along the periphery of one surface of a polyethylene terephthalate (PET) film through gravure coating of the composition for light shielding layers prepared according to Preparative Example 1. The first printed layer was formed from a first print roll having patterns corresponding to the first printed layer and having a regular hexagonal shape with 50 μm sides, the hexagonal shapes being separated from each other to form a honeycomb structure. After printing the first printed layer, a second printed layer was formed thereon using a second print roll. The second print roll was formed with patterns corresponding to the second printed layer, having a rhombus shape with 50 μm sides, the rhombus shapes being separated from each other. Pattern printing was performed such that the second printed layer could be formed on (e.g., over) the first printed layer and the major axis of the first printed layer was parallel to the major axis of the second printed layer. Finally, a light shielding layer having a structure as shown in FIG. 3 and FIG. 4 was formed. The light shielding layer (thickness: 2 μm) was formed by removing the solvent at 85° C. to 110° C. for 2 minutes through heat curing.

A polyvinyl alcohol film (thickness: 60 μm, polymerization degree: 2,400, saponification degree: 99.0%, VF-PS6000, Kuraray Co., Ltd., Tokyo, Japan) was subjected to swelling in an aqueous solution at 25° C., followed by dyeing and stretching in an iodine ion-containing dyeing bath at 30° C. Then, the dyed polyvinyl alcohol film was further stretched an initial length thereof in a boric acid solution at 55° C., thereby preparing a polarizer (thickness: 12 μm).

A bonding agent was applied to one surface of the PET film on which the light shielding layer was formed, followed by application of the bonding agent to one surface of a cycloolefin polymer film (ZB12-052125, Zeon Corporation, Tokyo, Japan) as a second polarizer protective film, and then the PET film and the cycloolefin polymer film were bonded to opposite surfaces of the polarizer, respectively, followed by UV curing, thereby preparing a polarizing plate, in which a bonding layer (thickness: 4 μm), the prepared polarizer, a bonding layer (thickness: 3 μm), and a second polarizer protective film were sequentially stacked on the surface of the PET film on which the light shielding layer was formed. UV curing was performed at a temperature of 22° C. to 25° C. and 20% to 60% RH using a metal halide lamp at 400 mW/cm$^2$ and 1,000 mJ/cm$^2$.

Example 2 to Example 4

Additional polarizing plates were prepared in substantially the same manner as in Example 1, except that alternate compositions for light shielding layers as listed in Table 1, Preparatory Examples 2-4, was used instead of the composition for light shielding layers of Preparative Example 1 in formation of the first printed layer and the second printed layer.

Comparative Example 1

A polarizing plate was prepared in substantially the same manner as in Example 1, except that the composition for light shielding layers of Preparative Example 5 was used instead of the composition for light shielding layers of Preparative Example 1 in formation of the first printed layer and the second printed layer.

Geometric details of the first printed layer and the second printed layer prepared in the Examples and Comparative Example are shown in Table 2.

TABLE 2

| First printed layer | Shape | Regular hexagonal shape |
|---|---|---|
| | Length of one side (μm) | 50 |
| | Length of major axis (μm) | 100 |
| Second printed layer | Shape | Rhombus shape |
| | Length of one side (μm) | 50 |
| | Length of major axis (μm) | 71 |
| ΔL (μm) | | 29 |
| H (μm) | | 43 |
| W (μm) | | 102 |

The polarizing plates prepared in Examples and Comparative Example were evaluated according to the properties shown in Table 3.

(1) Light shielding properties: Light shielding properties were measured on the light shielding layer of each of the polarizing plates prepared in the Examples and Comparative Example through a UV filter using a densitometer (TD-904: Gretag Macbeth Company, New Windsor, NY) in accordance with JIS K7651:1988. In Table 3, the light shielding layers were evaluated based on absorbance at a wavelength of 550 nm using a UV-visible spectrophotometer (JASCO V-750, JASCO, Easton, MD). An absorbance value of 2.0 or more was rated as ⊚, an absorbance value of greater than 1.5 to less than 2.0 was rated as ○, an absorbance value of greater than 1.0 to 1.5 was rated as Δ, and an absorbance value of 1.0 or less was rated as X. A higher absorbance value indicates better light shielding properties.

(2) Generation of cracks in light shielding layer upon bonding of polarizer to protective film: Generation of cracks in the light shielding layer upon UV irradiation for UV cured formation of the bonding layer was evaluated for each of the polarizing plates in the Examples and Comparative Example. Generation of cracks in the light shielding layer was confirmed through the naked eye after irradiating a sample with light from a three-wavelength lamp. Generation of cracks in the light shielding layer was evaluated as "poor" and generation of no cracks therein was evaluated as "good".

(3) Reliability 1: Each of the polarizing plates prepared in the Examples and Comparative Examples was cut into a specimen having a size of 300 mm×150 mm (length×width). With the specimen placed in a weather resistance tester (Xe-B-1, Q-SUN), the surface of the PET film having the light shielding layer formed thereon was irradiated with sunlight for 500 hours. a* and b* values were measured on the light shielding layer of the polarizing plate using a colorimeter (CM-3600d, Minolta, Osaka, Japan) before and after irradiation with sunlight. The values of a* and b* were compared according to Equations 1 and 2.

(4) Reliability 2: Each of the polarizing plates prepared in the Examples and Comparative Examples was cut into a specimen having a size of 300 mm×150 mm (length×width). With the specimen placed in a weather resistance tester (Xe-B-1, Q-Lab, Cleveland, OH), the surface of the PET film having the light shielding layer formed thereon was irradiated with sunlight for 500 hours. OD values were measured on the light shielding layer of the polarizing plate using an X-Rite 300 (X-Rite, Inc., Grand Rapids, MI) before and after irradiation with sunlight. The measured OD values were compared according to Equation 3.

TABLE 3

| Item | Example 1 | Example 2 | Example 3 | Example 4 | Comparative Example 1 |
|---|---|---|---|---|---|
| Composition for light shielding layer | Preparative Example 1 | Preparative Example 2 | Preparative Example 3 | Preparative Example 4 | Preparative Example 5 |
| Light shielding property | ⊚ | ⊚ | ⊚ | ⊚ | ⊚ |
| Generation of crack | Good | Good | Good | Good | Poor |
| a* before irradiation | 0.64 | 0.67 | 0.63 | 0.64 | 0.66 |
| a* after irradiation | 0.47 | 0.49 | 0.45 | 0.47 | 0.12 |
| Value of Equation 1 (%) | 26.56 | 28.86 | 28.57 | 26.56 | 81.81 |
| b* before irradiation | 0.25 | 0.22 | 0.23 | 0.24 | 0.24 |
| b* after irradiation | 0.01 | −0.02 | −0.02 | −0.02 | −0.32 |
| Value of Equation 2 (%) | 96 | 109.09 | 108.70 | 108.33 | 233.33 |
| OD before irradiation | 3.8 | 3.7 | 3.6 | 3.7 | 3.8 |
| OD after irradiation | 3.5 | 3.4 | 3.4 | 3.4 | 2.8 |
| Value of Equation 3 (%) | 7.89 | 8.11 | 5.56 | 8.11 | 26.32 |

As shown in Table 3, the polarizing plates according to the present disclosure exhibited good light shielding properties and did not suffer from generation of cracks in the light shielding layer due to presence of the UV absorbent in the light shielding layer upon bonding of the polarizer to the protective film using the UV curable bonding agent through UV irradiation. In addition, the polarizing plates according to the present disclosure had a low variation rate of each of a* and b* as measured before and after UV irradiation for a long period of time. Further, the polarizing plates according to the present disclosure had a low variation rate of the OD value as measured before and after UV irradiation for a long period of time, and thus could minimize or reduce variation of the light shielding properties.

Conversely, the polarizing plate of Comparative Example 1 suffered from generation of cracks in the light shielding layer due to absence of the UV absorbent in the light shielding layer during UV irradiation to bond the polarizer to the protective film using the UV curable bonding agent, and thus could not be used as a polarizing plate. In addition, the polarizing plate of Comparative Example 1 had higher variation rates of a*, b* and OD values before and after UV irradiation for a long period of time compared to the polarizing plates of the Examples.

As used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all subranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

It should be understood that various modifications, changes, alterations, and equivalent embodiments can be made by those skilled in the art without departing from the spirit and scope of the present disclosure and equivalents thereof.

What is claimed is:

1. A polarizing plate composed of a display region and a non-display region surrounding the display region, the polarizing plate comprising:
    a polarizer;
    a bonding layer and a first polarizer protective film sequentially stacked on an upper surface of the polarizer; and
    a light shielding layer comprising an ultraviolet (UV) absorbent,
    wherein the light shielding layer is embedded in the bonding layer to constitute at least a portion of the non-display region, and the light shielding layer is on at least one surface of the first polarizer protective film,
    wherein the UV absorbent is present in an amount of about 0.05 wt % to about 5 wt % in the light shielding layer,
    wherein the bonding layer comprises a UV curable bonding agent,
    wherein the light shielding layer is formed from a heat-curable composition for light shielding layer, and
    wherein the light shielding layer comprises:
    a continuous non-printed region in the non-display region, and
    a printed region comprising a plurality of printed patterns separated from each other by the continuous non-printed region, the printed patterns comprising:
    a first printed layer and a second printed layer directly formed on the first printed layer, the second printed layer having a shape different from the first printed layer.

2. The polarizing plate according to claim 1, wherein the UV absorbent is further present on at least one surface of the light shielding layer.

3. The polarizing plate according to claim 1, wherein the UV absorbent has a maximum absorption wavelength of about 380 nm to about 420 nm.

4. The polarizing plate according to claim 1, wherein the UV absorbent comprises at least one selected from benzophenone, triazine, benzotriazole, oxanilide, phenyl salicylate, salicylate, cyanoacrylate, cinnamate, indole, azo, and naphthalene diimide-based UV absorbents.

5. The polarizing plate according to claim 1, wherein the UV absorbent comprises at least one selected from a benzophenone-based UV absorbent and a triazine-based UV absorbent.

6. The polarizing plate according to claim 5, wherein the benzophenone-based UV absorbent comprises a compound represented by Formula 1:

wherein $R^1$ is a $C_1$ to $C_4$ alkyl group; $R^2$ and $R^3$ are each independently a hydroxyl group, a $C_1$ to $C_8$ alkoxy group, or a halogen; n and m are each independently an integer of 0 to 5; and n+m is an integer of 5 or less.

7. The polarizing plate according to claim 5, wherein the triazine-based UV absorbent comprises a hydroxy phenyl triazine UV absorbent.

8. The polarizing plate according to claim 1, wherein the light shielding layer further comprises a UV stabilizer.

9. The polarizing plate according to claim 8, wherein the UV stabilizer is present in an amount of about 0.05 wt % to about 3 wt % in the light shielding layer.

10. The polarizing plate according to claim 8, wherein the UV stabilizer further comprises at least one selected from a hindered amine-based UV stabilizer and a metal complex salt-based UV stabilizer.

11. The polarizing plate according to claim 1, wherein the heat-curable composition for light shielding layer comprises a pigment, a binder resin, a heat-curing initiator, and the UV absorbent.

12. The polarizing plate according to claim 11, wherein the pigment comprises at least one selected from carbon black and a silver-tin alloy.

13. The polarizing plate according to claim 11, wherein the binder resin comprises at least one selected from an acrylic resin, a polyimide resin, and a polyurethane resin.

14. The polarizing plate according to claim 1, wherein the heat-curable composition for light shielding layer further comprises a thermosetting unsaturated compound.

15. The polarizing plate according to claim 1, wherein the heat-curable composition for light shielding layer comprises the UV absorbent.

16. The polarizing plate according to claim 1, wherein the light shielding layer has a thickness of about 5 μm or less.

17. The polarizing plate according to claim 1, further comprising a second polarizer protective film on a lower surface of the polarizer.

18. The polarizing plate according to claim 1, wherein the polarizing plate has an a* variation rate of about 50% or less, as calculated by Equation 1:

$$a^*\text{variation rate}=|(a^*)500\text{ h}-(a^*)0\text{ h}|/|(a^*)0\text{ h}|\times 100, \quad \text{Equation 1}$$

wherein $(a^*)0$ h is an a* value measured on the light shielding layer of the polarizing plate prior to irradiation, and $(a^*)500$ h is an a* value measured on the light shielding layer of the polarizing plate after irradiation of the polarizing plate with sunlight for 500 hours.

19. The polarizing plate according to claim 1, wherein the polarizing plate has a b* variation rate of about 200% or less, as calculated by Equation 2:

$$b^*\text{variation rate}=|(b^*)500\text{ h}-(b^*)0\text{ h}|/|(b^*)0\text{ h}|\times 100, \quad \text{Equation 2}$$

wherein $(b^*)0$ h is a b* value measured on the light shielding layer of the polarizing plate prior to irradiation and $(b^*)500$ h is a b* value measured on the light shielding layer of the polarizing plate after irradiation of the polarizing plate with sunlight for 500 hours.

20. The polarizing plate according to claim 1, wherein the polarizing plate has an optical density (OD) variation rate of about 20% or less, as calculated by Equation 3:

$$\text{OD variation rate}=|(OD)500\text{ h}-(OD)0\text{ h}|/(OD)0\text{ h}\times 100, \quad \text{Equation 3}$$

wherein $(OD)0$ h is an OD value measured on the light shielding layer of the polarizing plate prior to irradiation, and $(OD)500$ h is an OD value measured on the light shielding layer of the polarizing plate after irradiation of the polarizing plate with sunlight for 500 hours.

21. An optical display comprising the polarizing plate according to claim 1.

22. A polarizing plate composed of a display region and a non-display region surrounding the display region, the polarizing plate comprising:

a polarizer;

a bonding layer and a first polarizer protective film sequentially stacked on an upper surface of the polarizer; and a light shielding layer comprising an ultraviolet (UV) absorbent, wherein the light shielding layer is embedded in the bonding layer to constitute at least a portion of the non-display region, and the light shielding layer is on at least one surface of the first polarizer protective film, wherein a total thickness of the light shielding layer and the bonding layer in the non-display region is the same as a thickness of the bonding layer in the display region, and the light shielding layer is between the bonding layer and the first polarizer protective film in the non-display region, wherein the UV absorbent is present in an amount of about 0.05 wt % to about 5 wt % in the light shielding layer, wherein the bonding layer comprises a UV curable bonding agent, wherein the light shielding layer is formed from a heat-curable composition for light shielding layer, and wherein the light shielding layer comprises:

a continuous non-printed region in the non-display region, and a printed region comprising a plurality of printed patterns separated from each other by the continuous non-printed region, the printed patterns comprising:

a first printed layer and a second printed layer directly formed on the first printed layer, the second printed layer having a shape different from the first printed layer.

\* \* \* \* \*